(12) United States Patent
Sengupta et al.

(10) Patent No.: US 10,289,568 B2
(45) Date of Patent: May 14, 2019

(54) APPLICATION-DRIVEN STORAGE SYSTEMS FOR A COMPUTING SYSTEM

(71) Applicant: Microsoft Technology Licensing, LLC, Redmond, WA (US)

(72) Inventors: Sudipta Sengupta, Redmond, WA (US); Jae Young Do, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 15/204,787

(22) Filed: Jul. 7, 2016

(65) Prior Publication Data

US 2018/0011801 A1   Jan. 11, 2018

(51) Int. Cl.
*H04L 29/06* (2006.01)
*G06F 12/14* (2006.01)
*G06F 3/06* (2006.01)
*H04L 29/08* (2006.01)
*G06F 21/60* (2013.01)
*G06F 21/78* (2013.01)

(52) U.S. Cl.
CPC .......... *G06F 12/1408* (2013.01); *G06F 3/067* (2013.01); *G06F 3/0622* (2013.01); *G06F 3/0659* (2013.01); *G06F 21/60* (2013.01); *G06F 21/78* (2013.01); *H04L 63/0428* (2013.01); *H04L 63/10* (2013.01); *H04L 67/1097* (2013.01); *G06F 2212/1052* (2013.01); *G06F 2212/154* (2013.01)

(58) Field of Classification Search
CPC ........................... H04L 47/2408; H04L 47/24
See application file for complete search history.

(56) References Cited

U.S. PATENT DOCUMENTS 8,769,187 B2   7/2014   Sutardja
8,819,335 B1   8/2014   Salessi et al.
8,935,463 B1   1/2015   Aswadhati et al.
(Continued)

OTHER PUBLICATIONS

"International Search Report and Written Opinion Issued in PCT Application No. PCT/US2017/040157", dated Sep. 18, 2017, 12 Pages.

(Continued)

*Primary Examiner* — Jason K Gee
(74) *Attorney, Agent, or Firm* — Ranjeev Singh; Singh Law, PLLC

(57) ABSTRACT

Systems and methods that allow secure application-driven arbitrary compute in storage devices in a cloud-based computing system are provided. A computing system including a compute controller configured to: (1) provide access to host compute resources, and (2) operate in at least one of a first mode or a second mode is provided. The computing system may further include a storage controller configured to provide access to storage systems including storage components, at least one compute component, and at least one cryptographic component. In the first mode, the host compute resources may be configured to execute at least a first operation on at least a first set of data stored in at least one of the storage components. In the second mode, the at least one compute component may be configured to execute at least a second operation on at least a second set of data.

21 Claims, 4 Drawing Sheets

(56) References Cited

U.S. PATENT DOCUMENTS

| | | | |
|---|---|---|---|
| 9,122,401 | B2 | 9/2015 | Zaltsman et al. |
| 2008/0162735 | A1 | 8/2008 | Voigt et al. |
| 2012/0077506 | A1* | 3/2012 | Wietfeldt ............ H04W 72/02 455/450 |
| 2013/0246427 | A1* | 9/2013 | Murata ............ G06F 17/30598 707/737 |
| 2014/0281514 | A1 | 9/2014 | Erofeev et al. |
| 2015/0032938 | A1 | 1/2015 | Salessi |
| 2015/0294117 | A1* | 10/2015 | Cucinotta ............ G06F 21/74 713/189 |
| 2016/0019279 | A1 | 1/2016 | Sengupta et al. |

OTHER PUBLICATIONS

Seshadri, et al., "Willow: A User-Programmable SSD", In Proceedings of the 11th USENIX conference on Operating Systems Design and Implementation, Oct. 6, 2014, 14 pages.

Cho et al., "The Solid-State Drive Technology, Today and Tomorrow", In Proceedings of IEEE 31st International Conference on Data Engineering, Apr. 13, 2015, pp. 1520-1522.

Riedel, et al., "Active disks for large-scale data processing", In Journal of Computer, vol. 34, Issue 6, Jun. 2001, pp. 68-74.

De, Arup, "A Compute Capable SSD Architecture for Next-Generation Non-volatile Memories", In Doctoral Dissertation, Jun. 2, 2014, 109 pages.

Kim, et al., "Fast, Energy Efficient Scan inside Flash Memory SSDs", in Proceedings of Second International Workshop on Accelerating Data Management Systems using Modern Processor and Storage Architectures, Sep. 2, 2011, 8 pages.

Minglani, et al., "Design Space Exploration for Efficient Computing in Solid State Drives with the Storage Processing Unit", In Proceedings of IEEE International Conference on Networking, Architecture and Storage, Aug. 6, 2015, pp. 87-94.

Cho, et al., "Active disk meets flash: a case for intelligent SSDs", In Proceedings of the 27th international ACM conference on International conference on supercomputing, Jun. 10, 2013, pp. 91-102.

Quero, et al., "Self-Sorting SSD: Producing Sorted Data inside Active SSDs", In Proceedings of 31st Symposium on Mass Storage Systems and Technologies, May 30, 2015, 7 pages.

Jo, et al., "On running data-intensive algorithms with intelligent SSD and host CPU: a collaborative approach", In Proceedings of the 30th Annual ACM Symposium on Applied Computing, Apr. 13, 2015, pp. 2060-2065.

Jun, et al., "BlueDBM: An Appliance for Big Data Analytics", In Proceedings of the 42nd Annual International Symposium on Computer Architecture, Jun. 13, 2015, 13 pages.

Hu, et al., "Exploring Data-Level Error Tolerance in High-Performance Solid-State Drives", In Proceedings of IEEE Transactions on Reliability, vol. 64, No. 1, Mar. 2015, pp. 15-30.

Do, et al., "Query Processing on Smart SSDs: Opportunities and Challenges", In Proceedings of the ACM SIGMOD International Conference on Management of Data, Jun. 22, 2013, 10 pages.

Kang, et al., "Enabling Cost-effective Data Processing with Smart SSD", In Proceedings of 29th IEEE Symposium on Massive Storage Systems and Technologies, May 2013, 12 pages.

Kang, et al. "The Multi-streamed Solid-State Drive", https://www.usenix.org/system/files/conference/hotstorage14/hotstorage14-paper-kang.pdf, 5 pages.

NVM Express, Rev. 1.2a, Oct. 23, 2015, 209 pages.

Blagojevic, et al. "Priority IO Scheduling in the Cloud", https://www.usenix.org/system/files/conference/hotcloud13/hotcloud13-blagojevic.pdf, 6 pages.

* cited by examiner

APPLICATION-DRIVEN STORAGE SYSTEMS FOR A COMPUTING SYSTEM

BACKGROUND

Computing systems, such as cloud-based computing systems, service a variety of users and tenants with various computing and storage needs. Such cloud-based computing systems include data-intensive computing. Data in such cloud-based computing systems is typically stored in SATA compatible magnetic hard-drives or solid-state drives (SSDs). The SSDs and the firmware to control the SSDs are provided by SSD vendors. Often the hardware refresh cycle for the SSDs and their firmware is three to five years, during which time the firmware inside the SSDs remains unchanged. During this time the cloud-based computing system operators have no choice but to work with outdated hardware and firmware. The outdated hardware and firmware hinders the deployment of innovative software by the operators of such cloud-based computing systems.

In addition, data in cloud-based computing systems may suffer a breach resulting in data being accessible to unauthorized persons. When such data is in a clear text form and is not encrypted, the unauthorized access may create issues for the operators of the cloud-based computing systems.

SUMMARY

In one example, the present disclosure relates to a computing system including a compute controller configured to: (1) provide access to a plurality of host compute resources corresponding to the computing system, and (2) operate in at least one of a first mode or a second mode. The computing system may further include a storage controller configured to provide access to a plurality of storage systems corresponding to the computing system, where at least one of the plurality of storage systems comprises a plurality of storage components, at least one compute component, and at least one cryptographic component. In the first mode, at least one of the host compute resources may be configured to execute at least a first operation on at least a first set of data, and where the first set of data is stored in at least one of the plurality of storage components. In the second mode, the at least one compute component may be configured to execute at least a second operation on at least a second set of data, where an encrypted version of the second set of data is stored in the at least one of the plurality of storage components, and where the at least one cryptographic component is configured to decrypt the encrypted version of the at least the second set of data and provide an unencrypted version of the second set of data to the at least one compute component. The at least one compute component may further be configured to execute the at least second operation by processing the unencrypted version of the second set of data and generate at least one result based on the processing.

In another aspect, the present disclosure relates to a computing system including a compute controller configured to (1) provide access to a plurality of host compute resources corresponding to the computing system, and (2) operate in at least one of a first mode or a second mode, where the plurality of host compute resources are accessible to a first application and a second application, and where the first application is configured to perform at least latency-sensitive storage operations and the second application is configured to perform at least throughput-sensitive storage operations. The computing system may further include a storage controller configured to provide access to a plurality of storage systems corresponding to the computing system, where at least one of the plurality of storage systems comprises a plurality of storage components and at least one compute component. In the first mode, at least one of the host compute resources may be configured to, based on a request from the first application or the second application, execute at least a first operation on at least a first set of data, and where the at least the first set of data is stored in at least one of the plurality of storage components, and where the at least one compute component may be configured to allow a higher priority access for performing the latency-sensitive storage operations than performing the throughput-sensitive storage operations on the at least the first set of data. In the second mode, the at least one compute component may be configured to: (1) based on a request from the first application or the second application, execute at least a second operation on at least a second set of data, where the at least the second set of data is stored in at least one of the plurality of storage components and (2) allow a higher priority access for performing the latency-sensitive storage operations than performing the throughput-sensitive storage operations on the at least the second set of data.

In yet another aspect, the present disclosure relates to a method in a computing system including a compute controller configured to: (1) provide access to a plurality of host compute resources corresponding to the computing system and (2) operate in at least one of a first mode or a second mode, and a storage controller, which may be configured to provide access to a plurality of storage systems corresponding to the computing system, where at least one of the plurality of storage systems comprises a plurality of storage components and at least one compute component. The method may include, in the first mode, using at least one of the host compute resources executing at least a first operation on at least a first set of data stored in at least one of the plurality of storage components. The method may further include, in the second mode, using only the at least one compute component executing at least a second operation on at least a second set of data stored in at least one of the plurality of storage components, wherein the second operation corresponds to performing a filter operation on the second set of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
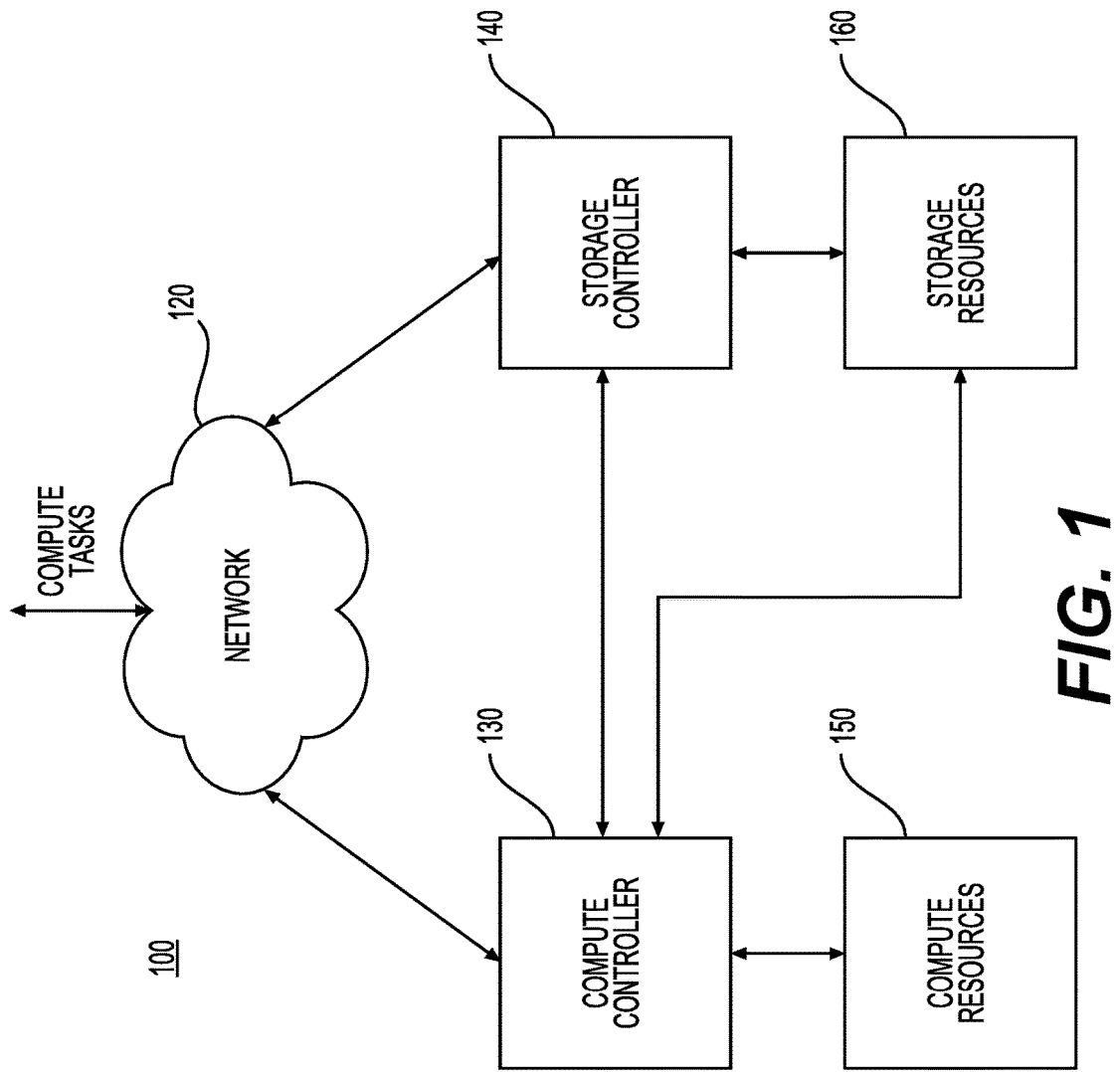
FIG. 1 is a block diagram of a cloud-based computing system in accordance with one example.

Examples described in this disclosure relate to systems and methods that allow application-driven arbitrary compute in storage devices in a cloud-based computing system. Other examples relate to systems and methods that allow secure application-driven arbitrary compute in storage devices in a cloud-based computing system. Application-driven arbitrary compute may provide several advantages over traditional cloud-computing platforms. As an example, custom capabilities may be added to the storage systems associated with the cloud-based computing system. Such custom capabilities may help bridge the gap between the needs of the applications being run in the system with the capabilities and the limitations of the storage systems, such as solid-state drives. In addition, the operators of the cloud-based computing system may deploy innovative capabilities in the cloud without having to wait for the next generation of SSD hardware. Moving the compute inside the SSDs may also help speed up data-centric processing in contrast with compute-centric processing. As an example, in data-centric processing, it is highly inefficient to move data across the interfaces among storage, memory (e.g., DRAM), and CPU for compute. Additional benefits of moving compute inside SSDs may include higher throughput, lower latency, and lower energy consumption. As an example, a storage system with multiple storage components, such as flash chips, that are coupled via multiple independent flash channels to compute components inside the storage system may have a higher throughput. With respect to lower latency, data-centric processing includes data-dependent access where access to a set of data depends upon a previous access to another set of data. With the compute inside the storage systems, such data-dependent access to storage systems with multiple storage components, such as flash chips, does not result in latency overheads associated with the host (CPU) memory and the host software stack. The energy consumption may also be lowered by avoiding the need for moving large volumes of data to the host memory and the host CPU for compute. Low-latency is required for user-facing applications, such as the various online services.

To provide low-latency response times in online services, it is necessary for many applications to get predictable low latency for SSD reads (e.g., reads related to the web search index). Such applications may need to periodically update the data they serve, however, concurrent writes can be happening in the background along with user-facing reads. Because the latency of a write is many times more than that of a read and because an individual flash chip cannot serve reads while executing writes, the resulting interference that writes have on user reads may lead to unpredictable increases in read latency. This is a major issue in many online services applications that can be addressed with programmable SSDs.

In addition, in cloud-based computing systems security of the data is a concern. Data breaches lower confidence of consumers in cloud-based data storage. One way to ameliorate the effect of a data breach is to encrypt the data and then compute. Computation on the encrypted data, however, is not easy. Homomorphic encryption may be used, but it is computationally intensive and it only works on certain classes of compute. One of the goals of the present disclosure is to enable arbitrary compute and yet protect the data from data breaches. In a cloud-based computing system, multiple customer replicas (e.g., copies of certain databases) are running on the same machine. When the data is decrypted, the data is clear text in the memory of the compute node. An unrelated process to one of the replicas may access the clear text data. One implementation is to make the SSD a trusted platform and move the computing to the SSD; in this implementation, there is no need to bring clear text outside the SSD. The keys for encryption/decryption may be stored inside the SSD. The cryptographic engine will be inside the SSD. Thus, such a SSD with multiple terabytes can provide arbitrary compute. With such a programmable SSD, an application may send the compute request to the SSD and get the answer. The host (e.g., general purpose compute resources in a cloud-based computing system) may never see the data. The programmable SSD may be configured such that no encrypted data or clear text comes out of the SSD. In some instances, encrypted data may only leave the SSD and go to the host. The arbitrary compute may be performed inside the SSD. The code may be cryptographically signed, before loading the code, the SSD will verify the signature.

FIG. 1 is a block diagram of a cloud-based computing system (CCS) 100 in accordance with one example. In this example, CCS 100 may include a compute controller 130, a storage controller 140, compute resources 150, and storage resources 160. Compute controller 130 and storage controller 140 may be coupled via a network 120. Compute tasks related to various applications run by users in CCS 100 may be submitted via network 120. Compute controller 130 may control access to compute resources 150. Compute resources 150 may include a number of compute nodes, where each compute node may include at least one CPU (which may be multi-core) and a virtual-machine manager to manage the virtual machines running on the compute node. In one example, a hypervisor may provide software corresponding to the virtual-machine manager. Network 130 may be a wired network, a wireless network, or a combination of these. Network 130 may also be a private network, such that CCS 100 may be a private cloud. Storage controller 140 may control access to storage resources 160. Storage controller 140 may do so by both providing a file-system service that allows users and applications to mount file systems and direct access to storage systems. Storage resources 160 may include storage systems that may provide different types of storage, including persistent storage. In one example, storage resources 160 may include storage for binary objects that applications may access via an application programming interface (API). Applications may use this type of storage to store databases. Databases may be replicated, such that there may be several replicas of the same data that could be stored in different storage systems. Storage resources 160 may also include volume storage allowing users to attach their virtual machines to volumes. Although FIG. 1 shows a certain number of components of CCS 100 arranged in a certain manner, there could be more or fewer number of components arranged differently.

Figure 2:
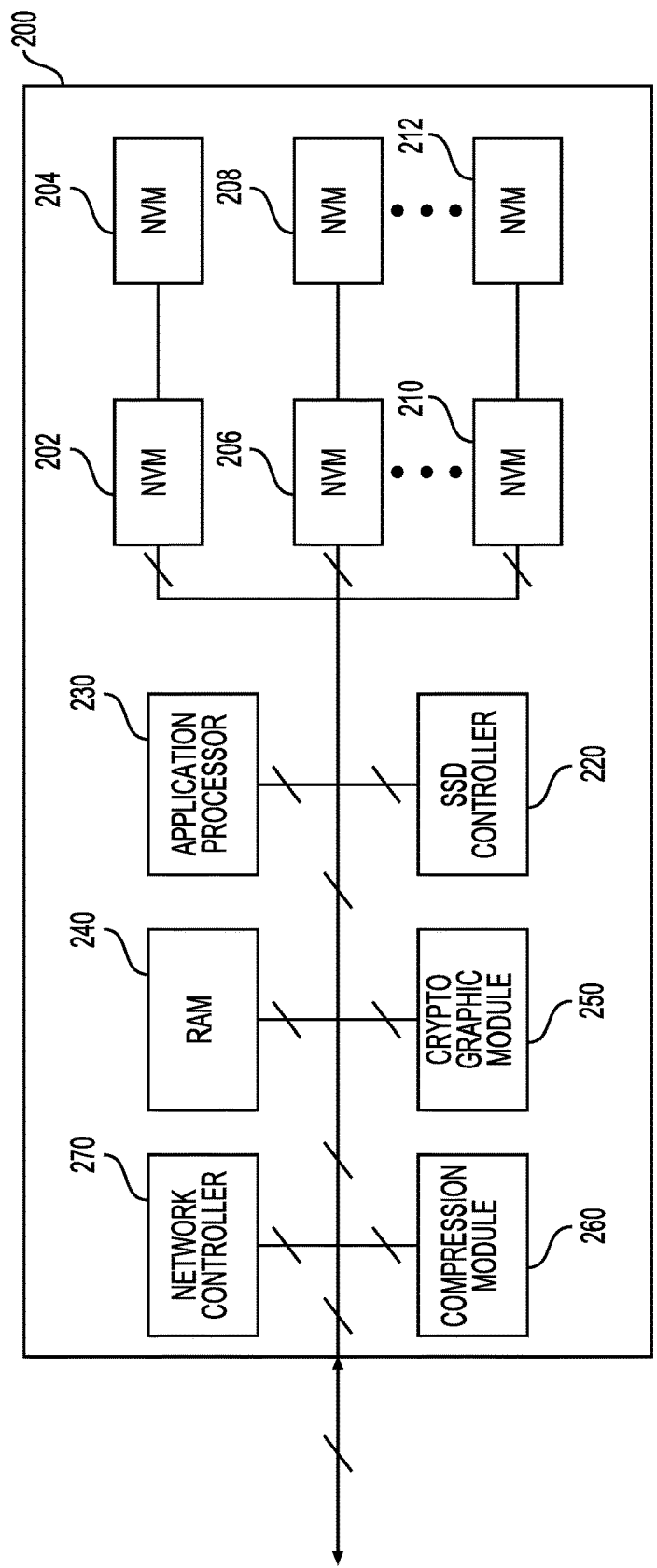
FIG. 2 is a block diagram of a storage system in accordance with another example.

FIG. 2 is a block diagram of a storage system 200 in accordance with one example. In this example, storage system 200 may include non-volatile memory (NVM) components (202, 204, 206, 208, 210, and 212), such as flash memory chips, a SSD controller 220, an application processor 230, a memory (e.g., RAM 240), a cryptographic module 250, a compression module 260, and a network controller 270. SSD controller 220 may control the NVM components for performing read, write, or erase operations related to the data stored in the NVM components. SSD controller 220 may be implemented using one or more Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). SSD controller 220 may provide functions, such as error correction and direct memory access (DMA). SSD controller 220 may perform various types of operations on the NVM components, in parallel, using independent channels 203, 205, and 207 or similar additional channels. As shown in FIG. 2, each channel may have multiple NVM components, such as 202 and 204 in channel 203, 206 and 208 in channel 205, and 210 and 212 in channel 207. SSD controller 220 may expose a raw flash interface that may explore the geometry of the raw flash chips comprising the NVM components. SSD controller 220 may enable data transfer between NVM components and host compute resources and the memory associated with the host compute resources. SSD controller may also cache data and store metadata for the FTL associated with the flash memory. SSD controller 220 may enable parallel data transfer using techniques, such as chip-level interleaving and channel-level interleaving. Alternatively, or additionally, SSD controller 220 may provide a logical block address space on top of the flash translation layer (FTL). Alternatively, or additionally, SSD controller 220 may provide a file system service allowing applications or users accessing CCS 100 to perform file system related operations, including saving, retrieving, and updating file-based data stored in NVM components. Alternatively, or additionally, SSD controller 220 may also provide an application program framework to applications being executed in CCS 100. This way the applications may perform a variety of operations directly on data stored in the NVM components without relying upon any other application programming interface.

With continued reference to FIG. 2, application processor 230 may provide the functionality related to at least one compute element for storage system 200. Application processor 230 may be implemented using one or more Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). The functionality of application processor 230 may be programmable via software or configurable in hardware. In this manner, the functionality of application processor 230 may be tailored or customized based on the applications being executed by the users of CCS 100. Application processor 230 may access the data stored in the NVM components via SSD controller 220. Application processor 230 may also read or write to RAM 240. This may allow application processor 230 to perform various compute operations on data stored in NVM components and provide the results of the computation to applications running on CCS 100. The proximity of application processor 230 to NVM components 202-212 via parallel independent channels may advantageously allow high bandwidth and low-latency access to storage. In one example, application processor 230 and NVM components 202-212 may be physically located on the same card. In another example, application processor 230 and NVM components 202-212 may be located in the same housing. In yet another example, application processor 230 and NVM components 202-212 may be physically located in the same chassis. In another example, application processor 230 and NVM components 202-212 may be physically located in the same rack. Other components of storage system 200 may also be included in any of the aforementioned examples. Application processor 230 may communicate with the applications running in CCS 100 and the host compute resources by using an application framework implemented on top of a communication protocol (e.g., SATA, SAS, PCI Express, or NVM Express) used by storage system 200.

Referring still to FIG. 2, cryptographic module 250 may provide encryption/decryption functionality as part of storage system 200. In one example, encrypted data relating to applications being used as part of CCS 100 may be stored in NVM components. The encrypted data may be retrieved by SSD controller 220 from any of the NVM components and provided to cryptographic module 250, which may then decrypt the data and provide it for use by application processor 230. In this example, application processor 230 may perform an operation based on a request from an application executing as part of CCS 100. The result of the operation may be provided to the application. This way arbitrary compute may be performed using storage system 100 without any clear text or unencrypted data leaving storage system 200. Cryptographic module 250 may also be used to encrypt any unencrypted or clear text data received from other portions of CCS 100 before such data is stored in NVM components. Although FIG. 2 shows a certain number of components of storage system 200 arranged in a certain manner, there could be more or fewer number of components arranged differently. As an example, storage system 200 may not include a cryptographic module.

With continued reference to FIG. 2, storage system 200 may include a compression module 260. Compression module 260 may compress data before it is written to any of NVM components 202-212. Additionally, compression module 260 may de-compress data after it is read from any of NVM components 202-212. In one example, application processor 230 may specify whether data needs to be compressed before storing or not. Certain applications may require faster access to data stored in NVM components 202-212. Such applications may be executed using application processor 230 that may store data without requiring compression or de-compression.

Still referring to FIG. 2, storage system 200 may include a network controller 270. In one example, each of the many storage systems in a cloud-based computing system may include network controller 270. This way, each of the storage systems may communicate directly with each other without involving network controllers associated with host compute resources, such as compute resources 150 of FIG. 1. In addition, this communication may occur without any co-ordination or involvement of compute controller 130 of FIG. 1. In this example, network controller 270 may allow independent data exchange among storage systems 200. This may allow application processor 230 to implement distributed computing without involving host compute resources (e.g., 150 of FIG. 1) or compute controller 130. Thus, each network controller 270 may have an associated MAC address, or a similar address, allowing storage systems to collaborate with each other in executing applications or other computing in a distributed fashion. In one example, storage controller 140 may include additional networking resources, such as switches to allow storage systems that are not associated with the same host compute resources to communicate with each other without using the networking resources used by host compute resources to communicate with each other.

In one example, the arbitrary compute may relate to performing selection, projection, and aggregation type of operations on a set of data. In this example, the data may be stored and indexed using a column-store index. Column-store indexed tables store data column-wise instead of row-wise, as traditional row-based indexes do. An entire row need not be read from the memory. Instead, column 1 may be one block of data, column 2 may be the second block of data and so on. In this example, the available data may be divided into different row groups (e.g., segments). Each of these segments may consist of 1 million rows, and the rows may be encoded & compressed by using several algorithms. In this example, each column may be separated into its own segments. After the data is encoded and compressed, then the segments may be stored on a storage disk. Each segment may also contain metadata about the number of rows, the size of the data, and the min/max values.

In one example, data-warehouse queries may include predicates (e.g., filters) and aggregations (e.g., sum, average, etc.). Thus, one example may relate to determining the quarterly purchases made by a specific customer. For these types of query workloads, some segments could be effectively skipped by using the segment metadata (e.g., min and max values). However, this may still be inefficient. For example, in a case where there is a predicate that filters out most of the data from a segment, regardless of how many rows actually are needed from the segment, the whole segment may have to be fetched from the disk that has the stored data. In the worst case scenario, in order to use just a single row, 1 million rows may have to be loaded from a storage disk. If the average size of the row is 100 bits, then, in this example, there may be a requirement to load 100 bits*1 million=100 MB segment data to use only 100 bits of data from a row. One possible way to address this issue may be to create segments with smaller number of rows (e.g., 100 or 1000). This, however, would result in a high number of small-size I/O requests between the host and the storage, which may be inefficient. In this example, to improve the performance the filter operation may be performed using storage system 200. This is because the filter operation is not compute-intensive, so this could be efficiently implemented/processed by application processor 200 of FIG. 2. By having small-size segments and processing the predicates inside storage system 200, one may advantageously not only save I/O bandwidth, but also the host memory consumption, and the host CPU cycles which are required to decompress/decode the unnecessary data. As discussed earlier, by using multiple independent channels in storage system 200, the bandwidth (relating to the transfer of the data inside storage system 200) may equal or surpass the bandwidth of the memory (e.g., DRAM) associated with the host compute resources. In this way, sequential scan codes may be sent to storage system 200 and the scanning may be performed inside storage system 200. In addition to the filtering operation, the cost of processing aggregations may also be reduced. Thus, programmable SSDs may advantageously bring more benefits by processing aggregation operations inside SSDs, such as storage system 200.

A related issue with performance in cloud-based computing systems, such as CCS 100, is providing resource governance across different types of services co-located on the same server and the same SSD. In one example, latency sensitive applications (e.g., user-facing online services) and throughput greedy, batch analytics jobs may be co-located on the same server, with the aim of increasing CPU utilization, increasing service density, and reducing COGS (cost of goods and services). It is possible for the I/O requests for latency sensitive services to queue up, inside the SSD, behind those of throughput greedy jobs, thus leading to unacceptable increases in I/O completion latency of the latency sensitive services. Software in host compute resources of CCS 100 to prioritize I/O requests for latency sensitive services over throughput greedy jobs may be limited in its ability to solve the problem, because the host compute resources need to maintain a high enough number of outstanding I/O requests to the SSD device to increase device utilization. One way to address this problem is to implement priority based handling of I/O requests inside the SSD device to provide the ability for I/O requests from latency sensitive services to "jump ahead" of the requests for throughput greedy jobs.

Figure 3:
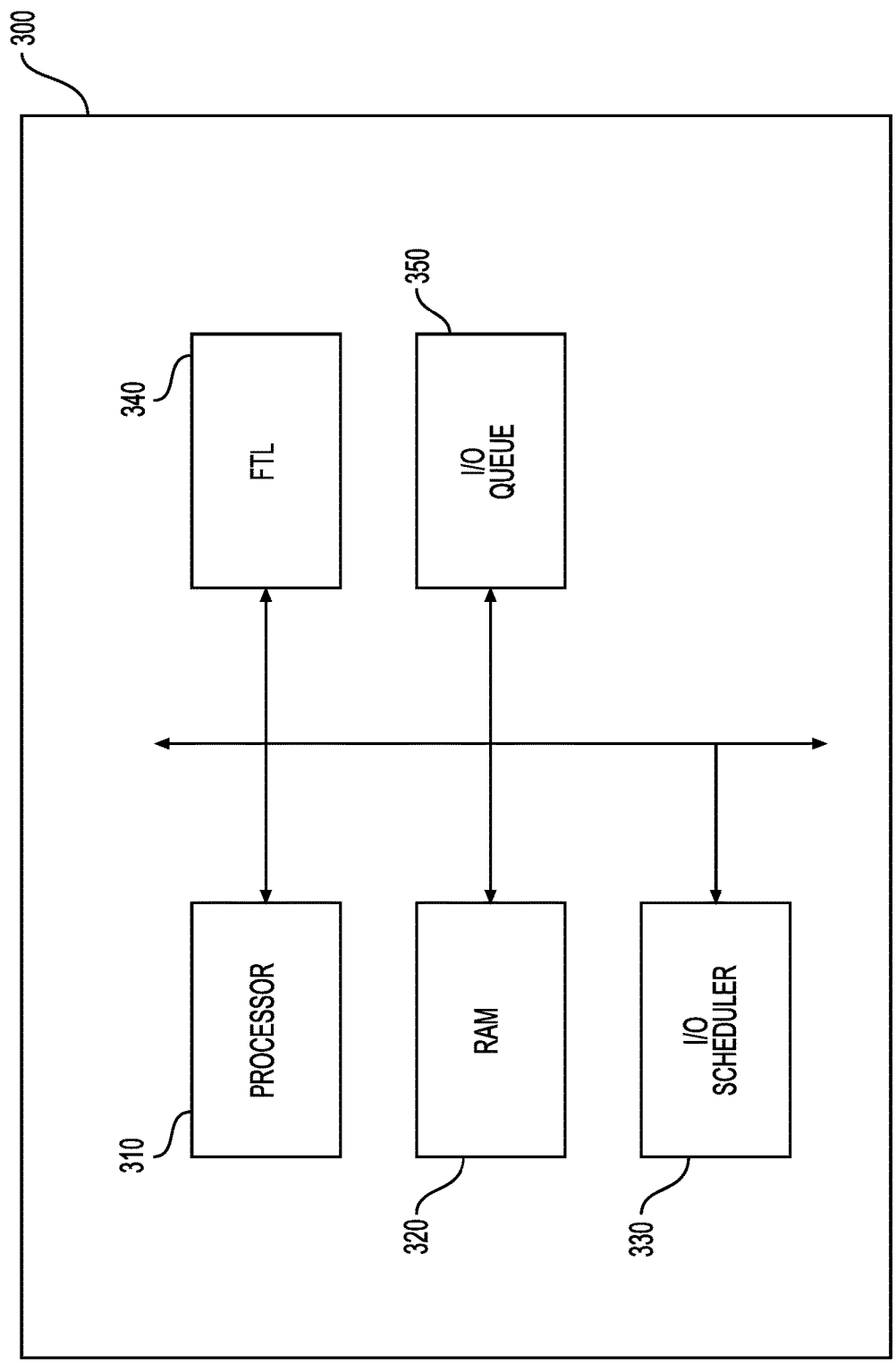
FIG. 3 is a block diagram of a SSD controller in accordance with one example.

FIG. 3 is a block diagram of a SSD controller 300 in accordance with one example. SSD controller 300 may include a processor 310, a RAM 320, an I/O scheduler 330, a flash translation layer (FTL) 340, and an I/O queue 350. As described earlier with respect to FIG. 2, SSD controller 310 may control various NVM components for performing read, write, or erase operations related to the data stored in the NVM components. Also, as described earlier with respect to FIG. 2, SSD controller 310 may be implemented using one or more Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). SSD controller 310 may perform various types of operations on the NVM components, in parallel, using independent channels as shown in FIG. 2. In addition, as shown in FIG. 2, each channel may have multiple NVM components, such as 202 and 204 in channel 203, 206 and 208 in channel 205, and 210 and 212 in channel 207. RAM 320 may be used to store instructions related to SSD controller 310. As described in more detail later, I/O scheduler 330 may be used to prioritize I/O requests to/from the NVM components. FTL may be implemented in firmware and may provide the Flash Translation Layer functionality, including mapping logical block addresses (LBAs) corresponding to the operating system being run on the host compute resources to the physical block addresses (PBAs) of the NVM components. As described in more detail later, I/O queue 350 may be used to store I/O requests to/from the NVM components.

With continued reference to FIG. 3, in one example, I/O scheduler may process a priority value associated with each I/O request to/from the NVM components. The priority value may be inserted as part of the data requests being issued by the various applications running in CCS 100. As discussed earlier, the applications may be executed by virtual machines in CCS 100. A latency-sensitive application may request a higher priority I/O request by providing a priority value that corresponds to a higher priority. Similarly, a throughput-sensitive application may request a lower priority I/O request by providing a priority value that corresponds to a lower priority. I/O scheduler 330 may analyze the priority values and queue the data requests in I/O queue 350. I/O queue 350 may be implemented as a memory (e.g., a buffer) that could be used to store requests for higher priority I/O in a high priority queue and to store request for lower priority I/O in a low priority queue. I/O scheduler 330 may perform scheduling using a priority scheduling algorithm or a multi-level scheduling algorithm. The priority values may also be inserted by the host compute resources based on the type of application making the I/O request. Thus, a look-up table or another type of data structure may be used to associate latency-sensitive applications with the higher priority I/O and the throughput-sensitive applications with the lower priority I/O. With the prioritization of the I/O requests inside storage system 200, the NVM components may be better used to service latency-sensitive applications without delaying response to their I/O requests.

In another example, SSD controller 300 may help manage data fragmentation inside SSDs. SSDs are copy-on-write devices. In general, erase blocks contain 32-64 pages. Pages in a block can be written sequentially. To update data, however, pages cannot be erased; the entire block has to be erased. Valid pages have to be copied to somewhere else and then the entire block can be erased. Typically, data is written sequentially via a single write stream. Multi-tenancy in CCS 100 results in multiple replicas, e.g., database replicas that may be running at different speeds and are accessing the same storage. When the I/O requests come to the SSD device (e.g., storage system 200), the device does not know which writes belong to which tenant. Replicas may be unrelated and are running at different speeds, and performing garbage collection at different times. If the same erase block has data from multiple replicas, the lifetime of the stream objects is different. In general, it is better to have the objects/pages inside the same erase block to have the same lifetime. This way, an entire block can be replaced efficiently. So it is not a good idea to mix and match the streams. One way to avoid mixing and matching streams is to tag the writes with a stream ID, this way storage system 200 will store the writes with the same stream ID in a block and not store the writes with a different stream ID in the same block. In one example, each replica may have a corresponding stream ID. Replicas in turn may correspond to tenants or users of CCS 100. Not all tenants may have access to storage system 200. Accordingly, in one example, host compute resources may insert the stream IDs selectively in the write stream based on whether the writes are intended for storage system 200 or another type of storage. Host compute resources may open streams using an application program interface offered by SSD controller 220.

Figure 4:
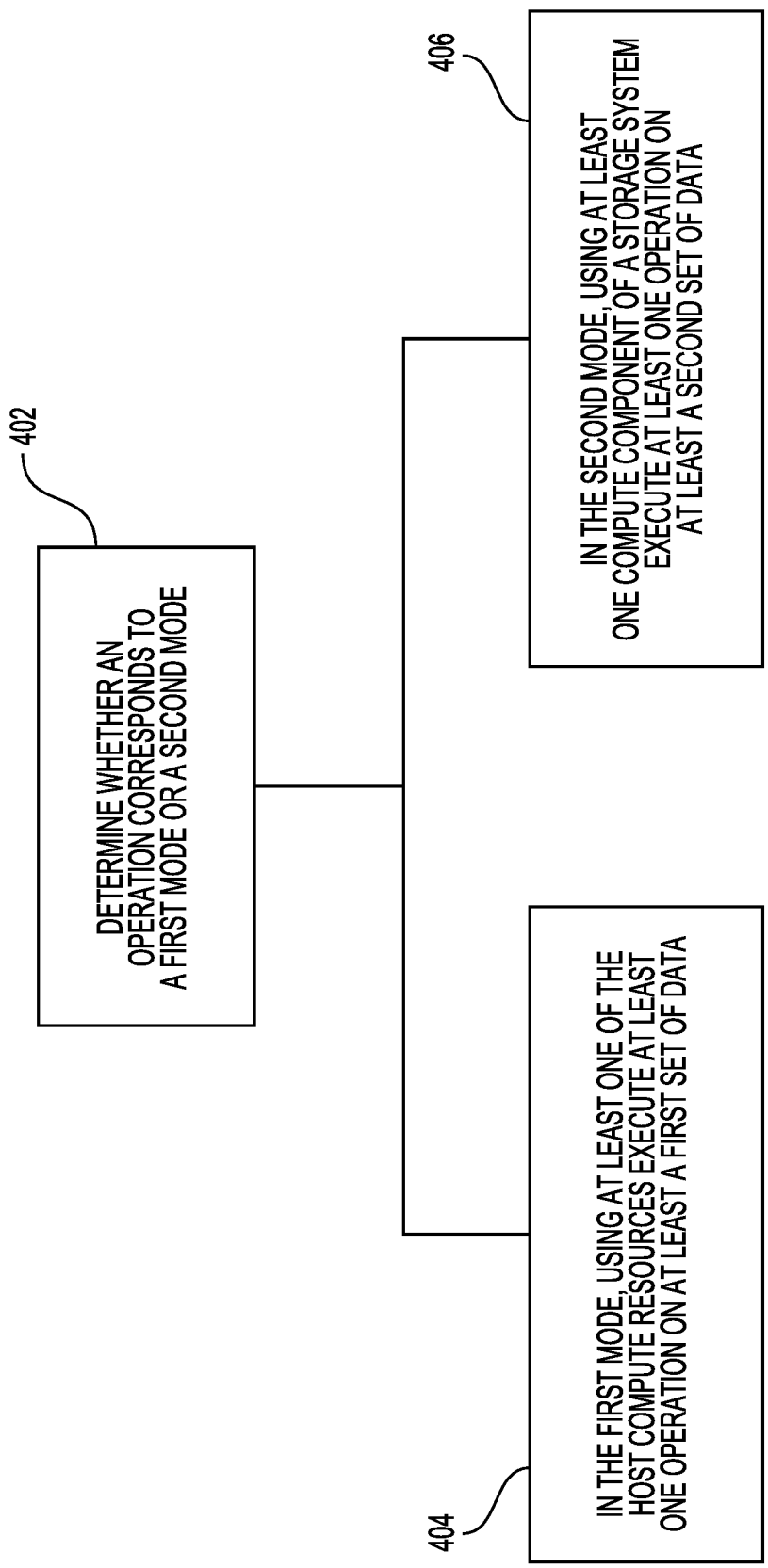
FIG. 4 is a flow diagram of a method in accordance with one example.

FIG. 4 is a flow diagram of a method 400 in accordance with one example. Method 400 may be executed by the various components of CCS 100. Step 402 may include determining whether an operation corresponds to a first mode or a second mode. In one example, this step may be performed by compute controller 130 of FIG. 1. As discussed earlier, compute controller 130 may provide access to host compute resources (e.g., compute resources 150 of FIG. 1). An operation may relate to any process that may be performed using any of the host compute resources or any of the compute components (e.g., application processor 230 of FIG. 2) in a storage system. Operations may include, but are not limited to, filter operations, select operations, project operations, or aggregate operations. Mode of the operation may be specified by an application running in CCS 100. Alternatively, the mode may be specified by an operating system running on host compute resources. The mode may not be expressly specified; instead, the different mode may be implied if any operations on a set of data different from another set of data could be performed using any of the host compute resources or any of the compute components (e.g., application processor 230 of FIG. 2) in a storage system. As part of step 404, in the first mode, at least one of the host compute resources may be used to execute at least one operation on at least a first set of data. The first set of data may be stored in storage system 200 or in another storage device corresponding to CCS 100. Alternatively, as part of step 406, in the second mode, at least one of the compute components of storage system 200 may be used to execute at least one operation on at least a second set of data. In one example, the second set of data may only be stored in storage system 200. Alternatively, in another example, the second set of data may be stored in storage system 200 or in another storage device corresponding to CCS 100.

In conclusion the present disclosure relates to a computing system including a compute controller configured to: (1) provide access to a plurality of host compute resources corresponding to the computing system, and (2) operate in at least one of a first mode or a second mode. The computing system may further include a storage controller configured to provide access to a plurality of storage systems corresponding to the computing system, where at least one of the plurality of storage systems comprises a plurality of storage components, at least one compute component, and at least one cryptographic component. In the first mode, at least one of the host compute resources may be configured to execute at least a first operation on at least a first set of data, and where the first set of data is stored in at least one of the plurality of storage components. In the second mode, the at least one compute component may be configured to execute at least a second operation on at least a second set of data, where an encrypted version of the second set of data is stored in the at least one of the plurality of storage components, and where the at least one cryptographic component is configured to decrypt the encrypted version of the at least the second set of data and provide an unencrypted version of the second set of data to the at least one compute component. The at least one compute component may further be configured to execute the at least second operation by processing the unencrypted version of the second set of data and generate at least one result based on the processing. The host compute resources may be accessible to a first application and a second application, and the first application may include the at least the first operation and the second application may include at least the second operation. Each of the plurality of the storage systems may further comprise a network controller configured to enable communication among the plurality of the storage systems without involving the compute controller. The storage controller may configured as a trusted domain such that the unencrypted version of the second set of data is not permitted outside the trusted domain. The cryptographic component may be configured to store at least one encryption key and at least one decryption key. Each of the plurality of storage components may comprise a non-volatile memory device. Each of the plurality of storage systems may comprise at least one solid state device controller, a plurality of flash memory devices, and a plurality of parallel independent channels connecting the plurality of flash devices to the solid state device controller.

In another aspect, the present disclosure relates to a computing system including a compute controller configured to (1) provide access to a plurality of host compute resources corresponding to the computing system, and (2) operate in at least one of a first mode or a second mode, where the plurality of host compute resources are accessible to a first application and a second application, and where the first application is configured to perform at least latency-sensitive storage operations and the second application is configured to perform at least throughput-sensitive storage operations. The computing system may further include a storage controller configured to provide access to a plurality of storage systems corresponding to the computing system, where at least one of the plurality of storage systems comprises a plurality of storage components and at least one compute component. In the first mode, at least one of the host compute resources may be configured to, based on a request from the first application or the second application, execute at least a first operation on at least a first set of data, and where the at least the first set of data is stored in at least one of the plurality of storage components, and where the at least one compute component may be configured to allow a higher priority access for performing the latency-sensitive storage operations than performing the throughput-sensitive storage operations on the at least the first set of data. In the second mode, the at least one compute component may be configured to: (1) based on a request from the first application or the second application, execute at least a second operation on at least a second set of data, where the at least the second set of data is stored in at least one of the plurality of storage components and (2) allow a higher priority access for performing the latency-sensitive storage operations than performing the throughput-sensitive storage operations on the at least the second set of data. A first priority value may identify each of the latency-sensitive operations and a second priority value may identify each of the throughput-sensitive operations. The compute component may be configured to allow the higher priority access for performing the latency-sensitive operations than performing the throughput-sensitive operations on the at least the first set of data or the at least the second set of data based on the first priority value and the second priority value. The storage controller may further comprise at least one cryptographic component. An encrypted version of the second set of data may be stored in the at least one of the plurality of storage components, and the at least one cryptographic component may be configured to decrypt the encrypted version of the at least the second set of data and provide an unencrypted version of the second set of data to the at least one compute component. The storage controller may be configured as a trusted domain such that unencrypted version of the second set of data is not permitted outside the trusted domain. Each of the plurality of the storage systems may further comprise a network controller configured to enable communication among the plurality of the storage systems without involving the compute controller. The cryptographic component may be configured to store at least one encryption key and at least one decryption key. Each of the plurality of storage components may comprise a non-volatile memory device. Each of the plurality of storage systems may comprise at least one solid state device controller, a plurality of flash memory devices, and a plurality of parallel independent channels connecting the plurality of flash devices to the solid state device controller.

In yet another aspect, the present disclosure relates to a method in a computing system including a compute controller configured to: (1) provide access to a plurality of host compute resources corresponding to the computing system and (2) operate in at least one of a first mode or a second mode, and a storage controller, which may be configured to provide access to a plurality of storage systems corresponding to the computing system, where at least one of the plurality of storage systems comprises a plurality of storage components and at least one compute component. The method may include, in the first mode, using at least one of the host compute resources executing at least a first operation on at least a first set of data stored in at least one of the plurality of storage components. The method may further include, in the second mode, using only the at least one compute component executing at least a second operation on at least a second set of data stored in at least one of the plurality of storage components, wherein the second operation corresponds to performing a filter operation on the second set of data. The second set of data may be stored only in one of the plurality of storage systems. Each of the plurality of storage systems may comprise at least one solid state device controller, a plurality of flash memory devices, and a plurality of parallel independent channels connecting the plurality of flash devices to the solid state device controller.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., RAM 240 or other types of non-transitory media. The term "non-transitory media" as used herein refers to any media storing data and/or instructions that cause a machine, such as any of the processors or controllers described in the present disclosure, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A computing system comprising:
a compute controller configured to (1) provide access to a plurality of host compute resources corresponding to the computing system, and (2) operate in at least one of a first mode or a second mode, wherein the plurality of host compute resources are accessible to a first application and a second application, wherein the first application is configured to perform at least latency-sensitive operations and the second application is configured to perform at least throughput-sensitive operations, and wherein whether to operate in the first mode or the second mode is specified by a respective application; and
a storage controller configured to provide access to the first application and the second application via an application programming interface to a plurality of storage systems corresponding to the computing system, wherein at least one of the plurality of storage systems comprises a plurality of storage components and at least one compute component
(1) wherein in the first mode specified by the respective application, at least one of the host compute resources is configured to, based on a request from the first application or the second application, execute at least a first operation on at least a first set of data, and wherein the at least the first set of data is stored in at least one of the plurality of storage components, and wherein the at least one compute component is configured to allow a higher priority access for performing the latency-sensitive operations than performing the throughput-sensitive operations on the at least the first set of data, and
(2) wherein in the second mode specified by the respective application, the at least one compute component is configured to, based on a request from the first application or the second application, execute at least a second operation on at least a second set of data, wherein the at least the second set of data is stored in at least one of the plurality of storage components, and wherein the at least one compute component is configured to allow a higher priority access for performing the latency-sensitive operations than performing the throughput-sensitive operations on the at least the second set of data.

2. The computing system of claim 1, wherein a first priority value corresponds to each of the latency-sensitive operations and a second priority value corresponds to each of the throughput-sensitive operations.

3. The computing system of claim 1, wherein the at least one compute component is configured to allow the higher priority access for performing the latency-sensitive operations than performing the throughput-sensitive operations on the at least the first set of data or the at least the second set of data based on the first priority value and the second priority value.

4. The computing system of claim 1, wherein the storage controller further comprises at least one cryptographic component.

5. The computing system of claim 4, wherein an encrypted version of the second set of data is stored in the at least one of the plurality of storage components, and wherein the at least one cryptographic component is configured to decrypt the encrypted version of the at least the second set of data and provide an unencrypted version of the second set of data to the at least one compute component.

6. The computing system of claim 5, wherein the storage controller is configured as a trusted domain such that the unencrypted version of the second set of data is not permitted outside the trusted domain.

7. The computing system of claim 1, wherein each of the plurality of the storage systems further comprises a network controller configured to enable communication among the plurality of the storage systems without involving the compute controller.

8. The computing system of claim 4, wherein the at least one cryptographic component is configured to store at least one encryption key and at least one decryption key.

9. The computing system of claim 1, wherein each of the plurality of storage components comprises a non-volatile memory device.

10. The computing system of claim 1, wherein each of the plurality of storage systems comprises at least one solid state device controller, a plurality of flash memory devices, and a plurality of parallel independent channels connecting the plurality of flash devices to the solid state device controller.

11. A method in a computing system comprising a compute controller configured to: (1) provide access to a plurality of host compute resources corresponding to the computing system, wherein the plurality of host compute resources are accessible to a first application and a second application, wherein the first application is configured to perform at least latency-sensitive operations and the second application is configured to perform at least throughput-sensitive operations, and wherein whether to operate in the first mode or the second mode is specified by a respective application and (2) a storage controller configured to provide access to the first application and the second application via an application programming interface to a plurality of storage systems corresponding to the computing system, wherein at least one of the plurality of storage systems comprises a plurality of storage components and at least one compute component, the method comprising:
in the first mode specified by the respective application, using at least one of the host compute resources, based on a request from the first application or the second application, executing at least a first operation on at least a first set of data stored in at least one of the plurality of storage components, wherein the at least the first set of data is stored in at least one of the plurality of storage components, and wherein the at least one compute component is configured to allow a higher priority access for performing the latency-sensitive operations than performing the throughput-sensitive operations on the at least the first set of data; and
in the second mode specified by the respective application, at least one of the host compute resources, based on a request from the first application or the second application, executing at least a second operation on at least a second set of data stored in at least one of the plurality of storage components, wherein the at least the second set of data is stored in at least one of the plurality of storage components, and wherein the at least one compute component is configured to allow a higher priority access for performing the latency-sensitive operations than performing the throughput-sensitive operations on the at least the second set of data.

12. The method of claim 11, wherein a first priority value corresponds to each of the latency-sensitive operations and a second priority value corresponds to each of the throughput-sensitive operations.

13. The method of claim 11, wherein the at least one compute component is configured to allow the higher priority access for performing the latency-sensitive operations than performing the throughput-sensitive operations on the at least the first set of data or the at least the second set of data based on the first priority value and the second priority value.

14. The method of claim 11, wherein the storage controller further comprises at least one cryptographic component.

15. The method of claim 14, wherein an encrypted version of the second set of data is stored in the at least one of the plurality of storage components, and wherein the at least one cryptographic component is configured to decrypt the encrypted version of the at least the second set of data and provide an unencrypted version of the second set of data to the at least one compute component.

16. The method of claim 15, wherein the storage controller is configured as a trusted domain such that the unencrypted version of the second set of data is not permitted outside the trusted domain.

17. The method of claim 11, wherein each of the plurality of the storage systems further comprises a network controller configured to enable communication among the plurality of the storage systems without involving the compute controller.

18. The method of claim 14, wherein the at least one cryptographic component is configured to store at least one encryption key and at least one decryption key.

19. The method of claim 11, wherein each of the plurality of storage components comprises a non-volatile memory device.

20. The method of claim 11, wherein each of the plurality of storage systems comprises at least one solid state device controller, a plurality of flash memory devices, and a plurality of parallel independent channels connecting the plurality of flash devices to the solid state device controller.

21. A non-transitory computer readable medium comprising instructions corresponding to a method in a computing system comprising a compute controller configured to: (1) provide access to a plurality of host compute resources corresponding to the computing system, wherein the plurality of host compute resources are accessible to a first application and a second application, wherein the first application is configured to perform at least latency-sensitive operations and the second application is configured to perform at least throughput-sensitive operations, and wherein whether to operate in the first mode or the second mode is specified by a respective application and (2) a storage controller configured to provide access to the first application and the second application via an application programming interface to a plurality of storage systems corresponding to the computing system, wherein at least one of the plurality of storage systems comprises a plurality of storage components and at least one compute component, the method comprising:

in the first mode specified by the respective application, using at least one of the host compute resources, based on a request from the first application or the second application, executing at least a first operation on at least a first set of data stored in at least one of the plurality of storage components, wherein the at least the first set of data is stored in at least one of the plurality of storage components, and wherein the at least one compute component is configured to allow a higher priority access for performing the latency-sensitive operations than performing the throughput-sensitive operations on the at least the first set of data; and in the second mode specified by the respective application, at least one of the host compute resources, based on a request from the first application or the second application, executing at least a second operation on at least a second set of data stored in at least one of the plurality of storage components, wherein the at least the second set of data is stored in at least one of the plurality of storage components, and wherein the at least one compute component is configured to allow a higher priority access for performing the latency-sensitive operations than performing the throughput-sensitive operations on the at least the second set of data.

* * * * *